Nov. 22, 1966 H. KELCH 3,286,917
TARIFF AND FARE SELECTOR APPARATUS
Filed May 19, 1965
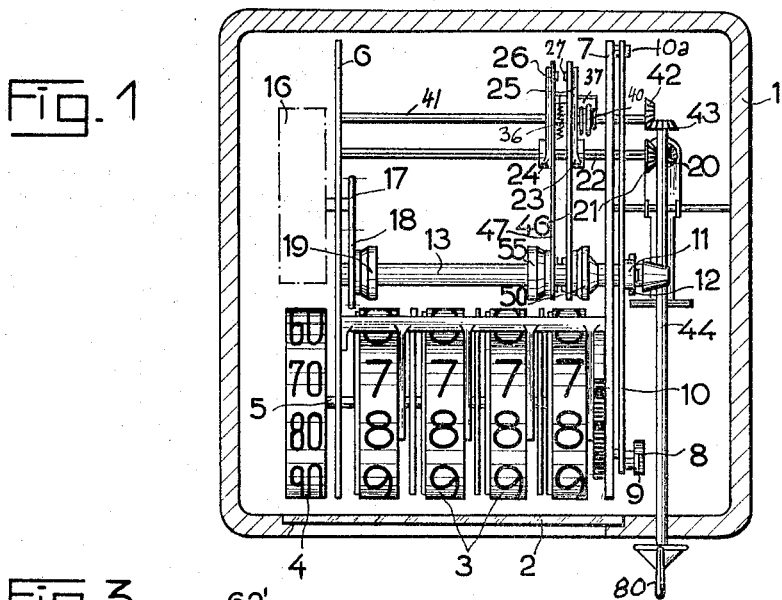
Fig. 1
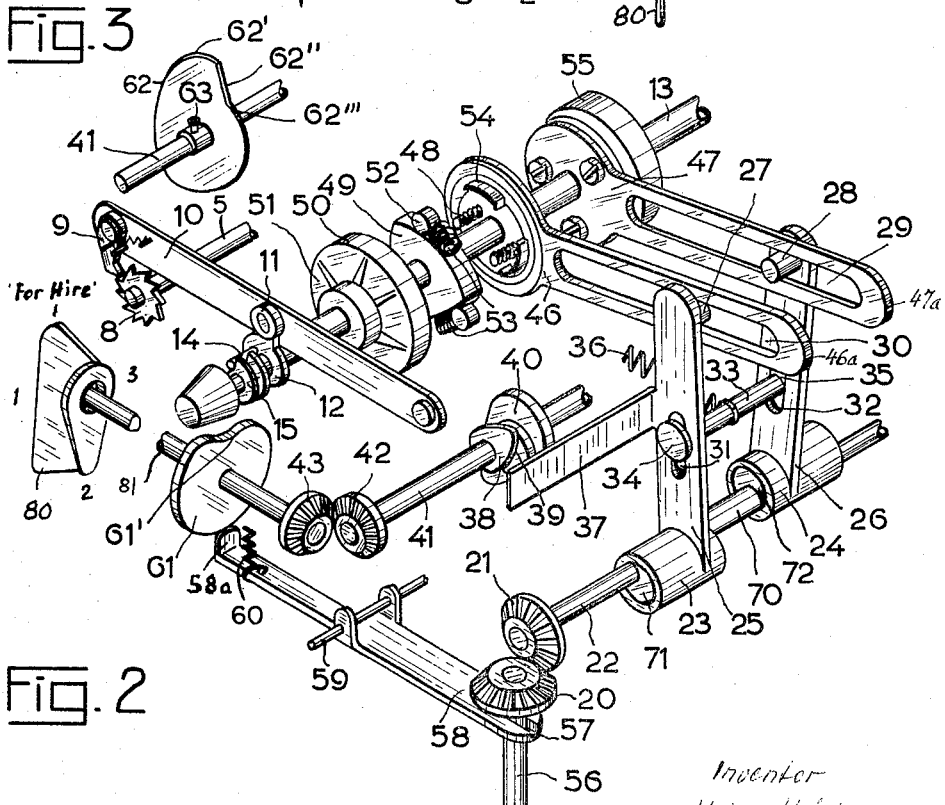
Fig. 3
Fig. 2
Inventor
Heinz Kelch
by Michael J. Striker

United States Patent Office 3,286,917
Patented Nov. 22, 1966

3,286,917
TARIFF AND FARE SELECTOR APPARATUS
Heinz Kelch, Villingen, Black Forest, Germany, assignor to Kienzle Apparate G.m.b.H., Villingen, Black Forest, Germany
Filed May 19, 1965, Ser. No. 457,228
Claims priority, application Germany, May 20, 1964, K 52,991
8 Claims. (Cl. 235—30)

The present invention relates to a tariff and fare selector apparatus for a taximeter, and more particularly to an apparatus for freely selecting the transmission ratio at which the fare registering and indicating drums of the taximeter are driven from the distance drive means which rotates in accordance with the distance or mileage covered by the car having the taximeter.

Known taximeters are provided with a transmission connecting the distance drive means with the drive shaft of the fare registering and indicating means, and this transmission has several stages for driving the fare registering and indicating means at different speeds corresponding to different tariffs. By setting the mechanism to different tariffs the transmission ratio is changed, and consequently the fare is different for the same distance of travel.

In known taximeters, gear transmissions stepwise shiftable between several stages are used, which has the disadvantage that if one or several tariffs are changed, a number of gears has to be exchanged in order to obtain again the correct transmission ratio for each new tariff.

The taximeter constructions according to the prior art can be adapted to new tariffs only under great difficulties by time consuming operations requiring the exchange of several parts.

It is one object of the invention to overcome the disadvantage of known taximeters, and to drive the fare registering means from the distance drive means by a gradually variable transmission so that any desired transmission ratio can be selected.

Another object of the invention is to drive the fare registering means of a taximeter continuously by a transmission and one way clutch means.

Another object of the invention is to drive the fare registering means of a taximeter by a transmission which can be gradually adjusted between different transmission ratios, and reliably maintained to operate at any selected transmission ratio.

Another object of the invention is to connect the fare indicating means with the distance drive means by a plurality of gradually variable transmissions which operate the fare registering means successively in the same additive sense, irrespective of whether the distance drive means are operated by the car moving forward or rearward.

With these objects in view, the present invention relates to a tariff and fare selector apparatus for a taximeter. One embodiment of the invention comprises fare registering means, preferably including indicator drums; distance drive means which respond to the mileage covered by the taxicab; a plurality of variable transmission means connecting the distance drive means with the fare registering means; and tariff setting means.

The variable transmission means include common control means for gradually varying the transmission ratio of the transmission means. The tariff setting means preferably include a manually operated means settable to a number of positions representing different tariffs, and adjustable selector means connecting the manually operated means with the control means of the transmission means.

The manually operated means which may be a knob or the customary flag of the taximeter, holds in each position the control means in a control position which is preferably adjustable. Consequently, the transmission means can be operated at a number of different transmission ratios which are freely selectable by adjustment of the selector means, and are set by the manually operated means when the driver has to select one of several tariffs.

In the preferred embodiment of the invention, a selector cam is mounted on a control shaft which is turned by the manually operated means. The selector cam can be secured to the control shaft in gradually adjusted angularly displaced positions and cooperates with the control means of the transmission so that by adjustment of the selector cam, the actual ratio of the transmission in any position of the manually operated means can be determined whenever the apparatus is to be adapted to a new tariff.

It is conventional in taximeters to drive the fare registering means by a drive shaft which is driven by the distance drive means or by a clockwork, depending on which moves faster, and this drive shaft is usually referred to as a "time-distance shaft."

In accordance with the present invention, this drive shaft is driven from the distance drive means through a plurality of gradually variable transmissions, as explained above, and each transmission has one-way clutch means which are directly connected to the drive shaft so that the fare registering means are driven successively by the one way clutches at the same speed and in the same direction of rotation for indicating the correct fare.

The transmission means preferably includes a pair of circular eccentric members rotated by the distance drive means and being angularly displaced 180° relative to each other, a pair of actuating members reciprocated by the eccentric members to move in opposite strokes, a pair of pin and slot connections between the actuating members, and a pair of one-way clutches driving the time-distance shaft of the taximeter. The control means of the transmission means is connected to the actuating members for simultaneously shifting the same so that the effective radius of the pin and slot connections in relation to the time-distance shaft is varied when the selector cam is turned by the manually operated fare setting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary horizontal sectional view of a taximeter provided with the apparatus of the invention;

FIG. 2 is a fragmentary schematic partly exploded perspective view illustrating an embodiment of the invention; and FIG. 3 is a fragmentary perspective view ilustrating a modified detail of the embodiment of FIG. 2.

Referring now to the drawings, the casing 1 of a taximeter has a glass window 2 through which the fare indicating drums 3, and a drum 4 indicating "extras" which are additions to the fare, are visible. The indicating drums are part of fare registering means which are mounted on a shaft 5 supported on a pair of walls 6 and 7. The wheels of the unit order are driven by a ratchet wheel 8 which is stepwise operated by pawl 9 carried by a lever 10. A roller 11 on lever 10 is periodically raised and lowered by a cam 12 so that lever 10 is angularly displaced about a pivot means 10a. Everytime lever 10 is permitted to move downward by cam 12, ratchet wheel 8 is shifted one step by pawl 9. Cam 12 is freely mounted on the drive shaft 13 of the taximeter and has a pin 14 cooperating with cam means 15 which is fixedly secured to drive shaft 13 and turns cam 12 by pin 14 whenever drive shaft 13 is turned.

Drive shaft 13, which is part of the fare registering means, is the so-called "time-distance shaft" of the taximeter and is either driven by a clockwork 16 over meshing gears 17 and 18, and a one-way clutch 19, or from the distance drive means in a manner which will be described hereinafter in greater detail. The arrangement is such that drive shaft 13 is turned by the clockwork or by the distance drive means depending on which moves faster so that when the taxicab is stopped, the clockwork drives the fare registering means. The one-way clutch 19 is a known friction roller clutch which is capable of transmitting rotary motion in one direction of rotation, and assumes a disengaged position if drive shaft 13 is driven faster from the distance drive means than from the clockwork.

This arrangement is known, and for example described in U.S. Patent 3,012,712.

Shaft 56 of the distance drive means is connected in a known manner to a part of the taxicab which moves at a speed proportionate to the speed of the car. Distance drive shaft 56 carries a bevel gear 20 meshing with another bevel gear 21 secured to another distance drive shaft 22. Eccentric means are secured to shaft 22 and include a pair of eccentric circular drive members 71 and 72 whose centers are angularly displaced 180° and are eccentric to the axis of shaft 22 so as to operate in different cycles. A sleeve portion 70 connects the two eccentric members 71 and is secured to shaft 22. Hub portions 23 and 24 surround eccentric members 71 and 72 and carry actuating members 25, 26 in the form of arms having longitudinal slots 31, 32, and free ends provided with pins 27, 28.

A shaft 33 passes through slots 31 and 32 and is secured against axial displacement by head portions 34, 35. A spring 36 is secured to shaft 33 and to a stationary part of the casing and urges actuating members 23, 25 and 24, 26 to turn together in counterclockwise direction until a control means 37 secured to arm 25 abuts one of three cams 38, 39 and 40 on a shaft 41 which carries a bevel gear 42. In the position illustrated in FIG. 2, the extremity of cam 39 abuts control means 37 which is shown to be a bar transversely projecting from arm 25.

A manually operable knob 80, which may be the flag of the taximeter, is turnable between an inoperative "For Hire" position and three positions representing different tariffs. Shaft 81 is turned by knob 80 between four corresponding positions, and carries a bevel gear 43 meshing with bevel gear 42, and a cam 61 with a recessed cam portion 61'. Cam 61 cooperates with a shifting lever 58 which is mounted for turning movement on a shaft 59 and has a cam follower portion 58a cooperating with cam 61. The free end of lever 58 has has a slot receiving a portion of distance drive shaft 56 between a bevel gear 20 and a fixed flange 57.

When knob 80 is in one of the three fare representing positions, cam 61 holds lever 58 against the action of a spring 60 in a position in which bevel gear 20 on distance drive shaft 56 meshes with bevel gear 21 of the input shaft 22. However, when knob 80 is turned to a "For Hire" position in which the recessed cam portion 61' is located opposite the cam follower portion 58a and engaged by the same, spring 60 turns shifting lever 58 to a position in which bevel gear 20 is lowered and disengaged from bevel gear 21 so that the coupling constituted by bevel bears 20 and 21 is disengaged whereby input shaft 22 is no longer driven by distance drive shaft 56.

Pins 27, 28 of actuating arms 25, 26 are respectively located in slots 30 and 29 of a pair of arms 46a and 47a projecting from the drive parts 46 and 47 of a pair of one-way clutches which have driven parts 50 and 55 secured to drive shaft 13.

Screws 48 connect the drive parts 46 and 47 with a cam body 49, cam bodies 49 being respectively located in the drum-shaped driven parts 50 and 55. FIG. 2 shows the one-way clutch including drive part 46 and driven part 50 in an exploded view from which it is apparent that cam body 49 has a plurality of outer cam faces supporting rollers 52 on which springs 53 act. The drive part 46 has abutment portions 54 supporting the free ends of spring 53. The shape of the cam faces of cam body 49 is selected so that the rollers 52 are clamped in wedge-shaped chambers when a drive part 46 or 47 is turned in one direction so that the respective driven part 50 or 55 is turned in the same direction for turning drive shaft 13, while during turning of drive parts 46 and 47 in the opposite direction of rotation, the roller clutches are released, and drive shaft 13 is not turned. The illustrated roller clutch construction is known, and not an object of the present invention.

During rotation of shaft 22 and the cylical movement of eccentric members 71, 72, arms 25 and 26 reciprocate longitudinally in opposite strokes, and consequent cyclically and alternately angularly reciprocate drive parts 46, 47. Since each one-way clutch is in the engaged position only during movement in one direction, the two one-way clutches are alternately and successively effective to turn shaft 13 an angle corresponding to the angular displacement of drive parts 46 and 47.

The angle of this angular displacement depends on the position of pins 27 and 28 in slots 30 and 29. When pins 27, 28 are closer spaced from the axis of shaft 13 about which drive parts 46, 47 turn, the effective arms of pins 27, 28 are shorter, and consequently the one-way clutches and drive shaft 13 will be turned through greater angles than in a position in which pins 27 are located near the free ends of arms 46a, 47a.

Since spring 36 urges arms 25, 26 to turn in counterclockwise direction, the position of pins 27, 28 in slots 30, 29 and the effective lever arm of the pins, depends on the height of the cam 38, 39 or 40 which engages control means 37. The greatest radii of selector cams 38, 39, 40 are different, and the extremities of the three selector cams are spaced 90° about the axis of shaft 41.

When knob 80 is in the position "For Hire," none of the extremities engages control means 37, but the position of control means 37 and of arms 25, 26 is immaterial since the coupling 20, 21 is disengaged. When knob 80 is turned to one of the three positions which represent different tariffs, cams 38, 39, 40 are respectively placed in the position engaging control means 37, and holding arms 25, 26 with pins 27, 28 in corresponding positions by which the angular displacement of the one-way clutches and of drive shaft 13 is determined.

In the position illustrated in FIG. 2, the second tariff has been selected, and the second selector cam 39 is in the operative position engaging control means 37 so that pins 27 and 28 are in an intermediate position. When the smaller cam 38 is engaged by control means 37 under the action of spring 36, pins 27, 28 move farther to the left in slots 30, 29, and when the largest cam 40 is effective, pins 27, 28 move farther to the right.

It will be seen that members 71, 23, 25, 27, 46 constitute a first transmission, and members 72, 24, 26, 28, 47 constitute a second transmission having adjusting means 25, 26 separated by control means 37 to simultaneously set the two transmissions to the same transmission ratio. The transmission ratio can be gradually varied by moving control means 37 in such a manner that pins 27, 28 move along slots 29, 30. During such adjustment, the transmission ratio of both transmissions is gradually changed between a minimum and a maximum corresponding to positions of pins 27, 28 at the ends of slots 30, 29 and to the effective radii of levers 46 and 47.

Only three transmission ratios within the range of transmissoin ratios of the continuously variable transmissions, are selected by the three selector cams 38, 39, 40. Other transmission ratios can be selected by turning cams 38, 39, 40 or by replacing the same with other cams having higher or lower cam lobes and whose maximal radii are in a different ratio to each other.

In accordance with a modified embodiment of the invention, a single selector cam 62 replaces the three selector cams 38, 39, 40 and has a hub portion which can be secured by a screw 63 to shaft 41 in different angular positions of cam 62 in relation to shaft 41 whose position depends on the position of knob 80. Cam 62 has an extremity 62', a lowest portion 62''', and a steep shoulder 62'' connecting the highest and lowest points of the rising cam track with each other.

When a cam 62 replaces cams 38, 39, 40, it will be turned by knob 80 between positions in which control means 37 abuts the highest point 62' corresponding to the slowest rotation of drive shaft 13 and to the lowest tariff. When control means 37 abuts the lowest cam portion 62''', pins 27, 28 will be located at the left ends of slots 30, 29 corresponding to the fastest rotation of drive shaft 13 and to the highest tariff, while engagement of control means 37 with an intermediate portion of the rising cam track of selector cam 62 will correspond to an intermediate position of the pins and to an intermediate tariff. The shoulder 62'' engages control means 37 when knob 80 is turned from the position "For Hire" to positions representing the highest or the lowest tariff, or generally to a "hired" position.

By adjustment of the angular position of selector cam 62 on shaft 41 whose position is controlled by knob 80, arms 25, 26 with pins 27, 28 can be differently positioned when knob 80 is in one of the three tariff representing positions. For example, when the knob is turned to its first position, not the highest point 62' of cam 62 engages control means, but a lower point of the rising cam track. This lower point of the cam track may be spaced 15 to 20° from the highest point 62'. In this manner, different transmission ratios can be obtained by adjustment of selector cam 62 in each of the three positions of knob 80 by which the apparatus is set to a certain tariff.

Assuming that the knob or flag 80 is in the position "For Hire," the recessed portion 61' of cam 61 cooperates with cam follower portion 58a of shifting lever 58 so that coupling 20, 21 is disengaged. Shaft 22 with eccentric member 71, 72 is not driven.

Assuming that the driver turns the manually operated means 80, 81, 61, 43, 42, 41 together with selector cam means 38, 39, 40 to the position corresponding to a first tariff which may be indicated by an indicia 1 in the region of knob 80, spring 36 acts on shaft 33 to turn actuating members 23 to 28 together with control means 37 in counterclockwise direction as viewed in FIG. 2 until control means 37 abuts the extremity of selector cam 40 which, in this position of knob 80, is located directly opposite control means 37.

Pins 27 and 28 are disposed near the outer ends of slots 29, 30 in arms 46a, 47a.

Cam 61 has permitted spring 60 to move shifting lever 58 to a position in which coupling 20, 21 is engaged so that the eccentric members 71, 72 rotate and move arms 25, 26 and pins 27, 28 in opposite reciprocating strokes. Slots 31, 32 permit the reciprocating movement of arms 25, 26 while spring 36 maintains shaft 33 in substantially the same position and control means 37 slides up and down on cam 40. Actuating members 23, 25, 27 and 24, 26, 28 will at the same time perform an angular movement about shaft 33 so that pins 27, 28 oscillate in slots 30, 29. During the alternate upward strokes of pins 27, 28, drive shaft 13 is driven in one direction of rotation by the two one-way clutches, each of which is effective for 180°, so that the clutches are cyclically effective to rotate shaft 13 with cam 12 so that lever 10 drops once for each revolution of drive shaft 13 to actuate pawl 9 and to stepwise turn ratchet 8 with the corresponding wheel of the lowest order of the fare register means. During the downward strokes of pins 27, 28, no motion is transmitted to shaft 13.

The fare register means and the indicator drums 3 indicate the fare which corresponds to the distance travelled by the taxicab. Whenever the second or third tariff is selected by the driver by turning the knob or flag 80, the transmission ratio between distance drive shaft 56 and time-distance drive shaft 13 is changed, and by replacement or turning of selector cams 38, 39, 40, or of selector cam 62, any three transmission ratios can be selected from the infinite number of transmission ratios within a range whose upper and lower limits are determined by the effective radii of the ends of slots 29, 30 and which are obtained in different positions of pins 27, 28 in slots 30 and 29. For example, if it is determined that the third tariff is to be increased, all that is necessary is to exchange cam 38, or angularly displace cam 38 to a position in which a lower point of its rising cam track is engaged by control means 37 when knob 80 is placed in the third tariff representing position. Cams 38, 39, 40 are individually mounted on shaft 41 by hubs and screws as described and illustrated with reference to cam 62 in FIG. 3.

It will be understood that each of the elements described above, or two or more together, may also find a useful application in other types of taximeters differing from the types described above.

While the invention has been illustrated and described as embodied in a tariff and fare selector arrangement for a taximeter including an infinitely variable transmission between the distance drive means and the time-distance drive shaft of the fare register, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a taximeter, in combination, fare registering means; distance drive means; variable transmission means including an input shaft operatively connected with said distance drive means, a pair of circular eccentric members secured to said input shaft and being angularly displaced relative to each other an angle of 180°, a pair of actuating members including sleeves mounted on said eccentric members and arms projecting from the same, said arms having free ends carrying pins, a drive shaft for driving said fare registering means, a pair of one-way clutches, each one-way clutch having a driven part secured to said drive shaft, and a drive part operatively connected with the respective driven part for turning the same and thereby said drive shaft in one direction of rotation, each drive part having an elongated arm formed with a slot, said slots respectively receiving said pins for sliding movement so that upon rotation of said input shaft by said distance drive means, said arms of said actuating members reciprocate in opposite directions and cause opposite angular movements of said drive parts so that said driven parts alternately turn in one given direction and turn said drive shaft in said given direction for an angle determined by the distance of said pins from said drive shaft, spring means urging said actuating members to turn in one direction so that said pins are urged to move in one direction in said slots, respectively, and a control member connected with said actuating members and being also urged by said spring to move in one direction; and tariff setting means including a manually operated member, a control shaft operated by said manually operated member, and selector cam means secured to said control shaft for turning movement with the same, said tariff setting means being settable to a number of positions representing different tariffs, said selector cam means being engaged by said control member under the action of said spring so that said selector cam means holds said control means in said tariff representing positions in a corresponding number of control positions in which said pins are spaced different distances from said drive shaft whereby said transmission means can be operated at different transmission ratios.

2. An apparatus as set forth in claim 1 wherein said control member is a bar secured to said arm of one of said actuating members and in sliding engagement with said selector cam means.

3. An apparatus as set forth in claim 2 wherein each of said arms of said actuating members has a slot, and wherein said transmission means includes a shaft passing through said slots and being engaged by said spring whereby said arms of said actuating members perform angular motions about said last-mentioned shaft.

4. An apparatus as set forth in claim 2 and including a coupling between said distance drive means and said input shaft of said transmission means, a shifting lever for operating said coupling and having a cam follower portion; and including a cam turned by said manually operated member and having a recessed portion cooperating with said cam follower portion when said manually operated member is in a position indicating an inoperative condition, said coupling being shifted to a disengaged position by said shifting lever when said cam follower portion engages said recessed portion of said cam so that said transmission means, said drive shaft, and said fare registering means are not driven when said manually operated member is set to an inoperative condition.

5. In a taximeter, in combination, rotary fare registering means; distance drive means; a plurality of one way clutches assuming an engaged condition connected with said fare registering means when turned in one direction of rotation; a plurality of members respectively connected with said clutches and being angularly reciprocable in drive strokes in said one direction of rotation, and in opposite return strokes; a plurality of variable transmission means respectively connecting said distance drive means with said members; a plurality of drive members respectively connected with said transmission means and being cyclically operated by said distance drive means in different cycles to cyclically move said members in said drive strokes so that said fare registering means are rotated in said one direction by said one way clutches; and tariff setting control means for simultaneously and equally varying the transmission ratios of all said transmission means.

6. In a taximeter, in combination, rotary fare registering means; rotary distance drive means; a plurality of one way roller clutches assuming an engaged condition connected with said fare registering means when turned in one direction of rotation, a plurality of levers connected with said clutches and being angularly reciprocable in drive strokes in said one direction of rotation, and in opposite return strokes; and a plurality of transmission means connecting said distance drive means with said levers and including a plurality of angularly staggered excentric members rotated by said distance drive means, and actuating members cyclically reciprocated by said excentric members in different cycles and connected with said levers, respectively, to cyclically move said levers in said drive strokes for cyclically operating said one-way roller clutches so that said fare registering means are rotated in said one direction by said one way clutches; and tariff setting control means for simultaneously and equally varying the transmission ratios of all said transmission means.

7. In a taximeter, in combination, rotary fare registering means; rotary distance drive means; a plurality of one way roller clutches assuming an engaged condition connected with said fare registering means when turned in one direction of rotation; a plurality of levers connected with said clutches and being angularly reciprocable in drive strokes in said one direction of rotation, and in opposite return strokes; a plurality of variable transmission means connecting said distance drive means with said levers and including a plurality of angularly staggered excentric members rotated by said distance drive means, and actuating members cyclically reciprocated by said excentric members in different cycles and connected with said levers, respectively, to cyclically move said levers in said drive strokes so that said fare registering means are continuously rotated in said one direction by said one way clutches; control means connected with said actuating members for moving the same along said levers for setting said transmissions to the same transmission ratios and for gradually equally, and simultaneously varying said transmission ratios; and tariff setting means for operating said control means and for holding the same in selected positions, each corresponding to a different selected transmission ratio of said transmissions so that said fare registering means are driven at a speed associated with a selected tariff.

8. In a taximeter, in combination, rotary fare registering means; distance drive means; a plurality of one way clutch means for driving said fare registering means in the same direction of rotation; a plurality of variable transmissions each including a driven transmission element connected to one of said plurality of one-way clutch means and a driving transmission element adjustably connected to said driven transmission element so that by adjustment of the driving transmission elements the transmission ratio of the respective transmission may be varied; and a plurality of drive members each connected to one of said driving, transmission elements, and all of said drive members being connected to said distance drive means to be driven by the same independently from each other in different cycles so as to operate the respective driving transmisson elements and thereby the driven transmission elements and the corresponding one-way clutch means cyclically; control means for simultaneously adjusting the position of each of said driving transmission elements relative to the corresponding driven transmission elements so as to equally change the transmission ratios of said transmissions; and tariff setting means for operating said control means and for holding the same in any selected position corresponding to the same selected transmission ratio of said transmissions so that said fare registering means are driven at a speed associated with a selected tariff.

References Cited by the Examiner

UNITED STATES PATENTS

| 1,853,875 | 4/1932 | Orth | 235—30 |
| 2,428,080 | 9/1947 | Horn | 235—30 |
| 2,629,548 | 2/1953 | Miller | 235—30 |
| 2,698,132 | 12/1954 | Pontbriand | 235—30 |

FOREIGN PATENTS 660,637  11/1951  Great Britain.

RICHARD B. WILKINSON, *Primary Examiner.*

LEO SMILOW, *Examiner.*

C. G. COVELL, J. G. MURRAY, *Assistant Examiners.*